(12) United States Patent
Chen et al.

(10) Patent No.: US 6,794,001 B2
(45) Date of Patent: Sep. 21, 2004

(54) FLOORING WITH A 2-PART ADHESIVE

(75) Inventors: Hao A Chen, Chaddsford, PA (US); Yuhong Hu, Bellemead, NJ (US); Tianjian Huang, Hillsborough, NJ (US); Richard Judd, Newark, DE (US); Isaac Rufus, Newark, DE (US)

(73) Assignee: Mannington Mills, Inc., Salem, NJ (US)

(*) Notice: Subject to any disclaimer, the term of this patent is extended or adjusted under 35 U.S.C. 154(b) by 21 days.

(21) Appl. No.: 10/205,408

(22) Filed: Jul. 25, 2002

(65) Prior Publication Data

US 2004/0018333 A1 Jan. 29, 2004

(51) Int. Cl.[7] .................................................. B32B 3/00
(52) U.S. Cl. .................... 428/40.1; 52/384; 52/386; 52/387; 52/390; 52/391; 52/392; 52/746.1; 52/747.11; 428/41.3; 428/41.5; 428/50; 428/52; 428/192; 428/194; 428/355
(58) Field of Search .................. 428/40.1, 41.5, 428/50, 52, 192, 194, 355, 41.3; 52/384, 386, 387, 390, 391, 392, 746.1, 747.11

(56) References Cited

U.S. PATENT DOCUMENTS

| | | |
|---|---|---|
| 1,764,331 A | 6/1930 | Moratz |
| 1,808,591 A | 6/1931 | Bruce |
| 2,004,193 A | 6/1935 | Cherry |
| 2,152,694 A | 4/1939 | Hoover |

(List continued on next page.)

FOREIGN PATENT DOCUMENTS

| | | | |
|---|---|---|---|
| DE | 28 20 395 | 2/1979 | |
| EP | 0 493 010 A1 | 7/1992 | ............... C09J/5/00 |
| JP | 4298584 | 10/1992 | ............... C09J/5/08 |
| JP | 5179207 | 7/1993 | ............... C09J/5/04 |
| JP | 5346058 | 12/1993 | ........... E04F/15/04 |
| JP | 7305487 | 11/1995 | ........... E04F/15/04 |
| WO | WO 98/58142 | 12/1998 | ........... E04F/15/04 |
| WO | WO 01/94720 | 12/2001 | |

OTHER PUBLICATIONS

U.S. Published patent application No. US 2002/0031646 A1.
U.S. Published patent application No. US 2001/0021431 A1.
U.S. patent Publication No. US 2002/0142135 A1.
European Search Report for EP 03 01 6568 dated Dec. 19, 2003.
International Search Report for PCT/US03/22870 dated Mar. 03, 2004.

*Primary Examiner*—Nasser Ahmad
(74) *Attorney, Agent, or Firm*—Kilyk & Bowersox, P.L.L.C.

(57) ABSTRACT

A floor surface is described which involves a plurality of planks joined together using a 2-part adhesive system. Pre-applied adhesives on one or more floor panels are further described as well as methods of installing the floor panels to form a floor surface.

39 Claims, 2 Drawing Sheets

U.S. PATENT DOCUMENTS

| | | | |
|---|---|---|---|
| 2,852,813 A | 9/1958 | Sale | |
| 2,882,560 A | 4/1959 | Plendl | |
| 3,200,553 A | 8/1965 | Frashour et al. | |
| 3,263,228 A | 7/1966 | Abrahams et al. | |
| 3,437,360 A | 4/1969 | Gould et al. | |
| 3,579,941 A | 5/1971 | Tibbals | 52/384 |
| 3,615,975 A | 10/1971 | Gillern et al. | 156/79 |
| 3,616,040 A | 10/1971 | Toback | 156/310 |
| 3,658,624 A | 4/1972 | Lees | 156/332 |
| 3,699,736 A | 10/1972 | Wallace | 52/436 |
| 3,720,027 A | 3/1973 | Christensen | 52/309 |
| 3,731,445 A | 5/1973 | Hoffman et al. | |
| 3,750,728 A | 8/1973 | Stark | 144/315 |
| 3,785,103 A | 1/1974 | Turner | 52/309 |
| 3,802,986 A | 4/1974 | Forsythe | 156/258 |
| 3,902,293 A | 9/1975 | Witt et al. | 52/392 |
| 3,916,055 A | 10/1975 | Wagner | 428/161 |
| 3,970,502 A | 7/1976 | Turner | 156/310 |
| 3,994,764 A | 11/1976 | Wolinski | 156/218 |
| 4,081,308 A | 3/1978 | Skoultchi | 156/310 |
| 4,095,388 A | 6/1978 | Breault | 52/747 |
| 4,095,913 A | 6/1978 | Pettersson et al. | |
| 4,126,504 A | 11/1978 | Wolinski et al. | 156/310 |
| 4,243,453 A | 1/1981 | McClintock | 156/152 |
| 4,297,158 A | 10/1981 | Wolinski et al. | 156/305 |
| 4,417,028 A | 11/1983 | Azevedo | 525/285 |
| 4,426,820 A | 1/1984 | Terbrack et al. | |
| 4,471,012 A | 9/1984 | Maxwell | |
| 4,474,915 A | 10/1984 | Grinacoff | |
| 4,678,824 A | 7/1987 | Lauria | 524/48 |
| 4,695,502 A | 9/1987 | Rush | |
| 4,719,264 A | 1/1988 | Lotz, Jr. | 525/203 |
| 4,731,140 A * | 3/1988 | Yontrarak | 156/154 |
| 4,805,287 A | 2/1989 | Perini et al. | 29/407 |
| 4,807,416 A | 2/1989 | Parasin | |
| 4,833,855 A | 5/1989 | Winter, IV | 52/592 |
| 4,845,910 A | 7/1989 | Hanson et al. | 52/288 |
| 4,910,048 A | 3/1990 | Sinclair | 427/208.6 |
| 4,953,335 A | 9/1990 | Kawaguchi et al. | |
| 5,055,156 A | 10/1991 | Marino et al. | 156/499 |
| 5,205,895 A | 4/1993 | Hohman, Jr. et al. | 156/293 |
| 5,283,102 A | 2/1994 | Sweet et al. | |
| 5,295,341 A | 3/1994 | Kajiwara | |
| 5,296,535 A | 3/1994 | Nesiewicz et al. | 524/446 |
| 5,304,268 A | 4/1994 | Hoopengardner | 156/90 |
| 5,348,778 A | 9/1994 | Knipp et al. | |
| 5,437,934 A | 8/1995 | Witt et al. | |
| 5,543,455 A | 8/1996 | Shah | |
| 5,618,602 A | 4/1997 | Nelson | 428/60 |
| 5,626,705 A | 5/1997 | Winterowd et al. | 156/304.5 |
| 5,674,338 A | 10/1997 | Parker et al. | 156/98 |
| 5,694,730 A | 12/1997 | Del Rincon et al. | |
| 5,706,621 A | 1/1998 | Pervan | |
| 5,736,227 A | 4/1998 | Sweet et al. | |
| 5,797,237 A | 8/1998 | Finkell, Jr. | |
| 5,804,019 A | 9/1998 | Sweet et al. | 156/250 |
| 5,836,125 A | 11/1998 | Regina | 52/306 |
| 5,860,267 A | 1/1999 | Pervan | |
| 5,865,936 A | 2/1999 | Edelman et al. | 156/310 |
| RE36,177 E * | 4/1999 | Rouyer | 53/428 |
| 5,894,700 A | 4/1999 | Sweet | 52/391 |
| 5,900,099 A | 5/1999 | Sweet et al. | 156/278 |
| 5,965,646 A | 10/1999 | Norby | 524/247 |
| 5,966,889 A | 10/1999 | Zinner | 52/606 |
| 6,001,204 A | 12/1999 | Halg et al. | 156/108 |
| 6,006,486 A | 12/1999 | Moriau et al. | |
| 6,023,907 A | 2/2000 | Pervan | |
| 6,094,882 A | 8/2000 | Pervan | |
| 6,098,365 A | 8/2000 | Martin et al. | 52/592.1 |
| 6,101,778 A | 8/2000 | Martensson | |
| 6,169,132 B1 | 1/2001 | Fickeisen et al. | 524/271 |
| 6,182,410 B1 | 2/2001 | Pervan | |
| 6,205,639 B1 | 3/2001 | Pervan | |
| D442,296 S | 5/2001 | Kulik | D25/138 |
| D442,298 S | 5/2001 | Kulik | D25/138 |
| D442,706 S | 5/2001 | Kulik | D25/138 |
| D442,707 S | 5/2001 | Kulik | D25/138 |

* cited by examiner

FLOORING WITH A 2-PART ADHESIVE

BACKGROUND OF THE INVENTION

The present invention relates to flooring products such as laminate floors, wood floors, and the like. More particularly, the present invention relates to a system to join together floor panels to form a floor surface using an adhesive system.

Many European producers of laminate flooring have relentlessly innovated products to strengthen their position on the flooring market. The latest development efforts have resulted in successfully introducing the glue-free laying system. The connection of the plank is primarily based on a mechanical click of the tongue and groove. Therefore, it is also called a mechanical locking system. Recently, rapid progress of glue-free laying systems was made, which had a tremendous impact on the market place due to the overwhelming acceptance of the glue-free system in the installation community and do-it-yourself market. For 2001 and 2002, virtually all laminate flooring producers had a click system for their products.

The majority of consumer complaints on glued bonding systems were caused by either too much or too little or wrong glue application. As a result, the planks were not joined together properly. The most common problems were seam peaking, a gap at the joint and plank separation, and the like. All of these problems were apparently solved with a mechanical locking system. In addition, the glue-free laying system has significantly reduced the time needed to install a floor and also provided a more comfortable feeling during the installation process by hearing the click sound which is the indication of the planks being joined in place properly. Furthermore, the glue-free laminate flooring can immediately be open to foot traffic without concern of any glue set-up time which could take up to 24 hours. In addition, removing the glue squeezed out of the joint and onto the surface can be very time consuming.

A mechanical locking system has provided significant benefits in the ease of installation, namely, it makes the installation faster, neater, and provides a better fit of the plank joint. However, the requirement to tilt the plank at certain angles to connect the end tongue of one plank in the end groove of the other plank already laid on the floor can be a challenge for the beginner or even an experienced installer. Furthermore, after attaching the short joint, the long side of the joints must be connected by lifting the planks to let the tongue go in the groove of the previous row and fit the planks in place. This procedure has caused some problems for the installer. First, to lift the planks of the entire row prior to connecting the long seam to the previous row can separate or loosen already connected planks from the connection.

Also, the joint strength of planks on a mechanical locking system is typically not as strong as that of the planks connected by glue at the joint. The weak joint strength can potentially cause the joints to flex up and down vertically and move left to right horizontally under heavy traffic or long term traffic exposure. The consequence of this weak joint strength is to form gaps/openings, which can be susceptible to moisture and dirt penetration and thereby create an unpleasant appearance.

Furthermore, in the manufacture of the flooring, the mechanical locking system typically requires running slower production speeds to minimize the dimensional variation and damage of the delicate profile configuration of the tongue and groove. Even with a slower operation speed, the scrap waste and off quality products is still relatively higher than the standard tongue and groove products. In addition, the tongue and groove profile of a mechanical click system typically is a larger dimension than that of standard tongue and groove. It requires more materials to machine into the adequate profile. From the amount of material point of view, the mechanical click system uses up more material.

In addition, laminate flooring and other flooring which is connected by connecting systems, such as complicated tongue and groove designs and other joint connections, are typically done with no adhesive between the joints. Many of the commercial products simply rely on the connecting system, such as a tongue and groove, to hold the panels together. However, this type of system has many flaws in that moisture and debris can enter the cracks created between the joints of the floor panels. The introduction of debris and moisture can cause the buckling or swelling of the product especially when the product contains particleboard or fiberboard underneath the wear layer. Also, once debris is located between the joints of a floor panel, this debris is quite difficult to remove, is unsightly, and can lead to further separation of the panels from each other.

In addition, a simple connecting system, such as a tongue and groove, with no other means to connect the panels together can at times lead to an uneven connection or loose connection which again is undesirable for purposes of walking on the surface as well as visual appearance. While adhesives can be used and applied to the joints of each floor panel, the application of the adhesive can be messy, expensive, and time consuming with respect to installing the floor surface. In addition, the application of the adhesive on the joints of the floor panels can be done unevenly and thus lead to the possibility of moisture penetrating those areas where adhesive was not adequately applied.

Accordingly, there is a need in the industry to overcome the above-identified problems and provide a floor system which adequately joins the floor panels together and yet avoids the problems identified above.

SUMMARY OF THE PRESENT INVENTION

A feature of the present invention is to provide a flooring system, such as a laminate flooring system or hardwood flooring system, that has improved moisture resistance between the joints and is not susceptible to damage caused by moisture entering the joints of floor panels connected together.

Another feature of the present invention is to provide a flooring system which avoids the need to apply adhesive at the site of installation and further avoids the uneven application of adhesive to the joints of the floor panels.

A further feature of the present invention is to provide an adhesive system which is easily activated at the time of installation and yet remains inactive during storage prior to installation.

A further feature of the present invention is to provide a flooring system with an adhesive system that adequately joins the joints of a floor panel together to provide sufficient joint strength and resistance to water.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a floor panel having at least two side edges, wherein one side edge has a first adhesive component present on at least a portion of the surface and the second side edge has a second adhesive component present on at least a portion of the surface, wherein said first adhesive component comprises at least one crosslinkable acetate polymer and at least one water-soluble polymer and the second adhesive component comprises at least one non-crosslinkable acetate polymer, at least one water soluble polymer, and at least one crosslinking agent.

The present invention also relates to a floor panel having at least one side edge that has either a) a first adhesive component on at least a portion of the surface of the side edge or b) a second adhesive component on at least a portion of the side edge, wherein the first adhesive component and the second adhesive component are described above and described in detail below.

The present invention further relates to a floor surface having a plurality of planks joined together wherein at least a portion of the planks are joined together at least in part by an adhesive comprising the reaction product of a first adhesive component comprising at least one crosslinkable acetate polymer and at least one water-soluble polymer and a second adhesive component comprising at least one non-crosslinkable acetate polymer, at least one water soluble polymer, and at least one crosslinking agent.

The present invention further relates to a method for installing a floor surface comprising the joining of one or more floor panels as described above.

It is to be understood that both the foregoing general description and the following detailed description are exemplary and explanatory only and are intended to provide a further explanation of the present invention, as claimed.

DETAILED DESCRIPTION OF THE PRESENT INVENTION

Figure 1:
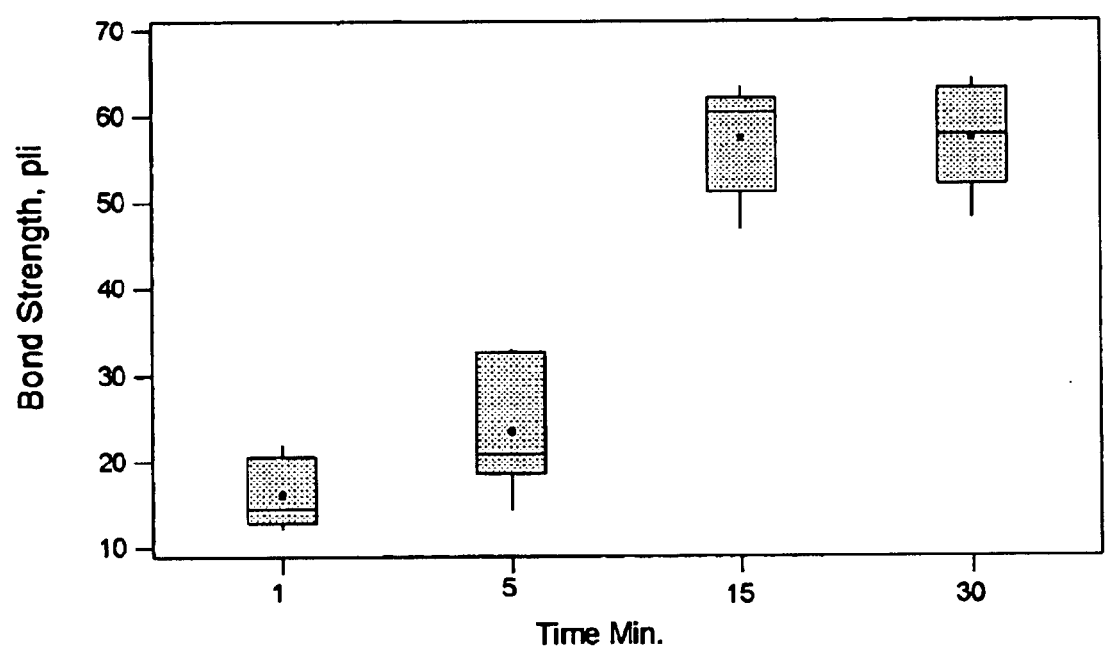
FIG. 1 is a graph showing bond strength over time for flooring with an adhesive of the present invention.

The present application relates to an adhesive system for the joining of floor products together to preferably form a continuous floor surface. The floor products, for purposes of the present invention, can be considered floor panels. For purposes of the present invention, a floor panel, includes, but is not limited to, any shape or size floor panel. In other words, the floor panel can be rectangular, triangular, square, hexagonal, octagonal or have any number of sides. Also, the floor panel can have other geometrical designs, such as curves and the like. As long as the floor panels can be joined together in some fashion, the present invention can be used. Thus, for purposes of the present invention, floor panel includes these various shapes and designs.

With respect to the type of floor panel, for purposes of the present invention, floor panel includes, but is not limited to, conventional laminate flooring which typically involves a core or substrate using a high or medium density fiberboard, paper, and/or particleboard and/or other wood-containing substrates. Other materials that can be used in the present invention include wood flooring also known as hardwood flooring or engineered wood flooring. Other examples of floor panels include polymer composite flooring such as thermoplastic or thermoset polymers with wood powder/particles or other materials as the fillers or composite forming components and polymer floor panels, such as thermoplastic or thermoset floor products, like iCORE™ floor products from Mannington. Again, any floor panel capable of being joined together with the adhesive system described herein can be used and embodied by the present invention.

With respect to the edges of the floor panels, which are joined together in some fashion, the floor panels can have straight edges or can have a tongue and groove design or there can be some intermediate connecting system used to join the floor panels together such as a spline or other connecting device. Again, any manner in which floor panels can be joined together with the adhesive system of the present invention is embodied by the present application. For purposes of the present invention, the floor panel can have a tongue and groove design or similar connecting design on the side edges of the floor panel. Examples of floor panels include, but are not limited to, the floor panels described in U.S. Pat. Nos.: 6,101,778; 6,023,907; 5,860,267; 6,006,486; 5,797,237; 5,348,778; 5,706,621; 6,094,882; 6,182,410; 6,205,639; 3,200,553; 1,764,331; 1,808,591; 2,004,193; 2,152,694; 2,852,815; 2,882,560; 3,623,288; 3,437,360; 3,731,445; 4,095,913; 4,471,012; 4,695,502; 4,807,416; 4,953,335; 5,283,102; 5,295,341; 5,437,934; 5,618,602; 5,694,730; 5,736,227; and 4,426,820 and U.S. Published Patent Application Nos. 20020031646 and 20010021431 and U.S. patent application Ser. No. 09/460,928, and all are incorporated in their entirety by reference herein.

In one embodiment, a floor panel can have at least two side edges wherein one side edge has a tongue design and the opposite side having a groove design, and wherein the tongue and groove are designed to have a mechanical locking system. These two edges are preferably the longer of the four side edges. The remaining two edges, preferably the short joints, can also have a mechanical locking system, such as the tongue and groove design, or the short joints can have a standard tongue and groove design, wherein one edge has a standard tongue design and the other edge has a standard groove design. The standard design is a design wherein the tongue and groove is not a mechanical locking system but is generally a tongue having a straight tongue design in the middle of the edge and the groove design has the counterpart groove to receive this tongue. Such a design has many advantages wherein a mechanical locking system can be used to connect the long sides of the plank, typically by tilting the tongue into the groove of a previously laid down plank. Then, the standard tongue and groove design on the short edges permits the connecting of the short edge of the plank to the previously laid plank without any tilting motion or lifting of the previous laid planks. The adhesive can be applied to all edges or just to the standard tongue and groove edges.

Thus, the present invention encompasses any type of joint or connecting system that adjoins edges of floor panels together in some fashion with the use of straight edges, grooves, channels, tongues, splines, and other connecting systems.

In the present invention, an adhesive, which is preferably a 2-part adhesive, is used in part to connect two or more floor panels together to form a floor surface. The preferred 2-part adhesive is preferably applied wherein a first adhesive component is applied to one portion of the edge of a floor panel and a second adhesive component is applied to an opposing surface edge wherein when the first adhesive component contacts the second adhesive component, an adhesive bond is formed. The first adhesive component and the second adhesive component can be present on the edges of the floor panels in any combination so long as when the floor panels are brought together, the first adhesive component on one edge comes in contact with the second adhesive component on the opposing edge surface of a second floor panel. Thus, in one embodiment, a floor panel having at least two side edges can be made such that the first adhesive component is on at least a portion of the surface of the edge that comes in contact with an opposing edge of another floor panel. A second edge on the same floor panel can contain the first or second adhesive component. As indicated, any combination can be created wherein, for instance, with a floor panel having four side edges, the opposing side edges of the same floor panel can have the first adhesive component while the other two opposing side edges can have the second adhesive component on the edges. Alternatively, a floor panel can have the same first adhesive component on all side edges of the same panel. A second floor panel can have the second adhesive component on all of its side edges. While preferably the entire side edge of the first floor panel coming in contact with the opposing side edge of a second floor panel receives a uniform or substantially uniform application of the first or second adhesive component, it is within the scope of the present invention that less than the entire interacting or contacting edge receives the first or second adhesive component.

Preferably, in a tongue and groove design, each surface of the tongue of the floor panels has one of the adhesive components and the surface of the groove that contacts the tongue always has the other adhesive component.

For purposes of the present invention, any application amount of the first adhesive component or second adhesive component can be used so long as the side edge is capable of connecting with an opposing side edge of a second floor panel. Preferably, the amount of adhesive present on the side edge is preferably from about 0.1 mil to about 55 mils and more preferably from about 0.5 mil to about 20 mils. The adhesive used is preferably applied prior to installation of the floor panels. More preferably, the adhesive is applied during the manufacturing process of the floor panel. In other words, one benefit of the present invention is the preferred application of the first component adhesive and second component adhesive to the edges of floor panels during the manufacturing of the floor panels in-line in a floor panel manufacturing site. Thus, the adhesives are pre-applied prior to installation. More preferably, the adhesive, which is preferably pre-applied, is dry upon leaving the site of manufacturing and then can be activated in such a manner that the first adhesive component comes in contact with the second adhesive component.

Preferably, the contacting of the 2-part adhesive results in a crosslinking reaction which forms a bond. In a preferred embodiment, the adhesives are more readily activated by the application of water to the surfaces of the adhesives. For instance, moisture in the air or humidity can activate the adhesives more readily. Alternatively, the adhesives can be more readily activated by contacting the adhesive surfaces with water such as by spraying the adhesive surfaces with water or using a wet/damp sponge or damp cloth.

The adhesive such as on the tongue, the groove, or both, can be conveniently remoistened with a pressure pump sprayer. A pressure head is pumped over the water in the reservoir. This pressure is then released by a trigger or spigot device which sprays an extremely fine jet of mist (e.g., atomized) from a nozzle. This is very effective at remoistening the adhesive. Since the no mechanical contact is made between the misting device and the joint being remoistened, the applicator is not clogged or contaminated by scraping the adhesive off the joint during moistening.

The adhesives upon being contacted with the first component and second component preferably results in a crosslinking reaction as well as a high Tg (glass transition temperature) bond strength. The adhesive, which is applied as a 2-part adhesive as mentioned above, is preferably flexible prior to reacting and thus (if this connection system is used), permits easy insertion of the side edge of one panel into the side edge of a second panel such as the interaction of a tongue and groove.

Once the adhesives are contacted and a bond is formed, the preferred bond strength is at least 5 PLI (pounds per linear inch) and more preferably at least 20 PLI and even more preferably at least 35 PLI and most preferably at least 50 PLI, such as 50 PLI to 300 PLI or more.

One benefit of the present invention is that the pre-applied adhesive can remain dormant for a substantial amount of a time such as for at least one month and preferably at least one year. Even after remaining dormant, the floor panels containing the first adhesive component or second adhesive component when mated or connected together in the installation process still results in an adhesive system being activated that forms a durable, water-resistant bond.

In one embodiment, the pre-applied adhesives on the edges of the floor panels can be activated with water such as with spraying with water and at least stand for a minute or more, such as 1 to 10 minutes. In such an embodiment, either or both adhesive components can be contacted with water or at least one component is preferably contacted with water.

Once the floor panels are connected together, any drying technique can be used in order to further expedite the curing process. The drying techniques can be as simple as letting the adhesive dry or any form of heat can be applied to increase the speed of the reaction to form the adhesive bond. For instance, microwave energy can be used.

In a preferred embodiment, the joint strength is best achieved after several hours such as from 5–8 hours or more after joining the edges together.

In another preferred embodiment of the present invention, the individual panels containing the first or second component of the present invention can be re-moistened even after two months or more. In other words, if the floor panels were moistened in preparation for preferred installation, but not used, the floor panels can be re-moistened again when needed for installation.

With respect to the 2-part adhesive used in the present invention, both parts of the adhesive result in non-crosslinkable pre-applied dry films before the bonding process is initiated. Once being remoistened by water and being mated together, a mixture of each adhesive component will occur resulting in crosslinking of the component parts. When dry, the substrates are held together by a strong durable bond that has good water and heat resistance.

In one embodiment the pre-applied adhesive comprises all vinyl-acetate (co) polymers. Particularly preferred adhesive formulations comprise vinyl acetate containing polyvinyl alcohol colloidal particles. These copolymers are typically synthesized from, but not limited to, vinyl acetate and N-methylol acrylamide (NMA). Other copolymers in the NMA family that can be used to prepare acetate copolymers include N-methylolmethacrylamide (NMMA), N-(alkoxymethyl)-acrylamides, N-(alkoxymethyl)-methacrylamides and esters of N-methylol(meth)acrylamide. The copolymers are typically formulated with a crosslinking agent for cohesive strength as well as for heat and water resistance. The reactive nature of the functional groups help crosslinking as to give cohesive strength.

Non-crosslinkable acetate polymers for use in the second adhesive component include, but are not limited to, vinyl acetate homopolymers and ethylene vinyl acetate copolymer.

Crosslinkable acetate polymers for use in the first adhesive component include, but are not limited to, NMA-vinyl acetate copolymer, NMMA vinyl acetate copolymer and NMA-ethylene-vinyl acetate copolymer.

The choice of the water-soluble polymers is not critical to the practice of the invention. The presence of the water soluble polymers gives both parts of the adhesive components sufficient water remoistenability as to help fast and easy installation and makes a uniform and sealed bond to provide final water resistance. The water soluble polymer is preferably chosen to be amorphous or have a low crystallinity, be compatible with the (co)polymer, and helps to slow the film formation process after being pre-applied. Typical water soluble polymers used in the pre-applied systems are polyvinyl alcohol, poly vinyl pyrrolidone, poly acrylamide, and combinations thereof. Other classes are known to be fully compatible but are not widely practiced. These include urea, hydroxy alkyl urea, and the like. A preferred water soluble polymer is polyvinyl alcohol. The polyvinyl alcohol is preferably at least partially hydrolyzed. Preferably, the degree of hydrolysis is about 92% or less, more preferably about 88% or less. Polyvinyl alcohol is commercially available from Kuraray and others. The ratio of water soluble polymer to acetate (co)polymer is preferably selected to give the right balance of water remoistenability, water resistance, and final bonding strength.

The use of a crosslinking agent adds to the cohesive strength and helps in the high temperature performance and water resistance of the adhesives. Typical crosslinking agents include aluminum chloride, aluminum nitrate, p-toluene sulfonic acid (p-TSA), sulfamic acid, and combinations thereof. The ratio of crosslinking agent to acetate polymer is selected to give the right balance of crosslinking strength, and the stability under high temperatures and high humidity environment.

A preferred first adhesive component of the invention comprises from about 20 to about 45% by dry weight of a crosslinkable acetate polymer, NMA-vinyl acetate copolymer being particularly preferred, and from about 3% to about 10% by dry weight of a polyvinyl alcohol. The first adhesive component also preferably comprises at least one defoamer in amounts of up to about 1% by dry weight, more typically from about 0.1 to about 0.5% by dry weight.

A preferred second adhesive component comprises from about 20 to about 45% by dry weight of a non-crosslinkable acetate polymer, vinyl acetate homopolymer being particularly preferred, from about 3 to about 10% polyvinyl alcohol, and from about 0.5 to about 3% by dry weight of a crosslinking agent. The second adhesive component preferably also comprises at least one defoamer in amounts of up to about 1% by dry weight, more typically from about 0.1 to about 0.5.

The adhesive is applied to a substrate while in its liquid state and allowed to dry to harden the adhesive layer. The adhesive can be allowed to air dry or can be dryed by other conventional means, such as with the use of ovens.

The reactivation efficiency, i.e., the ability of the adhesive to become wetted or moistened in a short period of time will depend on the water solubility of the water soluble polymer used. Reactivation time depends on receptivity of the adhesive, which depends on the coating weight or thickness of the adhesive and the amount of water applied.

In the practice of the invention, exposure to moisture is typically for periods of less that about 5 seconds. Pressure is typically applied for periods of less than about 30 seconds. Typically water is used to wet the surfaces. The water may be in the form of a mist as spray or steam. Rather than wet the surface of the planks during the installation process, the floor can, alternatively be laid dry, and then wet mopped to activate the adhesive.

Adhesive formulations can optionally contain conventional additives including but not limited to fillers including polysaccharide fillers, plasticizers, acids, waxes, synthetic resins, tackifiers, defoamers, preservatives, dyes, pigments, UV indicators, and other additives commonly used in the art.

Preservatives for use herein include those conventionally used in aqueous adhesives such as benzoates, amides and fluorides such as sodium fluoride. Also included are the hydroxybenzoic acid esters such as p-hydroxybenzoic acid methyl ester or p-hydroxybenzoic butyl ester. Commercially available preservatives which may be used in the practice of the invention include KATHON LXE sold by Rohm & Haas Company and Nipacide OBS sold by Clariant. The preservative will generally be included in amounts of from 0.05% to about 0.2% by weight.

The present invention will be further clarified by the following examples, which are intended to be exemplary of the present invention.

EXAMPLES

In the following examples, various flooring panels were tested with and without the adhesive system of the present invention. The pre-applied adhesive components a) and b) were pre-applied (prior to installation). At the site of installation, and prior to the joining of the floor panels, the panels were moistened as described above. The various tables below set forth the results of these tests.

The adhesives used in the experiments had the following formulations:

Example 1

Representative adhesive component parts A and B were prepared by mixing water with the ingredients shown in Tables 1 and 2. The polyvinyl alcohol used had a degree of hydrolysis of 72–76%. The defoamer was Dee Fo 215. $AlCl_3$ was used as the crosslinking agent. Ingredients are shown in percent by dry weight.

TABLE 1

First Adhesive Component

|  | Sample 1A | Sample 2A | Sample 3A |
|---|---|---|---|
| Water | 56.8 | 58.2 | 58.8 |
| NMA-vinyl acetate copolymer | 38 | | |
| NMA-ethylene vinyl acetate copolymer | | 35.6 | |
| NMMA-vinyl acetate copolymer | | | 36 |
| PVOH | 5 | 6 | 5 |
| Defoamer | 0.2 | 0.2 | 0.2 |

TABLE 2

Second Adhesive Component

|  | Sample 1B | Sample 2B |
|---|---|---|
| Water | 58.8 | 60.8 |
| Vinyl acetate Homopolymer | 34 |  |
| Ethylene vinyl acetate copolymer |  | 31 |
| PVOH | 5 | 6 |
| Defoamer | 0.2 | 0.2 |
| Crosslinking agent | 2 | 2 |

The following tests as well as Examples 2–12 were conducted using the adhesives 1A and 1B described above. The laminate used in Examples 5–11 was Butterscotch Australian Cypress 24023 from Mannington.

The "standing water" test was conducted as follows:

1) Prepare a six inch long joint with the appropriate joining system. Allow the joint to dry (24 hours unless otherwise specified).
2) On the deadweight gauge, measure the thickness of the product at the joint. Take five measurements on the joint at various spots close to the center.
3) Place a 3" ID PVC tube over the center of the joint. Seal the area at the base of the tube. If a bevel exists in the product, make sure the sealant goes into the bevel, Allow the sealant to set up (usually overnight).
4) Fill the pipe with 100 grams of the prescribed liquid to be tested. Unless otherwise specified this solution will be Rinse-Free Cleaner in water at the concentration prescribed by the instructions.
5) Allow the liquid to stand over the joint for a prescribed time, generally 24 hours unless otherwise specified. Note the test is over if all the liquid flows out before the prescribed time. In this case the time for flow-out is noted.
6) At the end of the twenty four hours, if the liquid still remains in the tube, pour all the liquid into a tared cup and weigh the liquid.
7) Determine how much liquid is recoverable by putting 100 g in the tube over an area not containing a joint. Pour the liquid out carefully and weigh how much is recovered. This liquid must be the same liquid used in the test.
8) Measure the thickness of the joint at five points which were under area the tube was placed.

Water Resistance—1A and 1B

| | | 24 Hour Rinse-free Standing Water Test | | | |
|---|---|---|---|---|---|
| Adhesives | Installation | Tongue and Groove type | Leaking Observation | Peaking Observation | Results |
| 1A + 1B | Remoistening | 10 mil T&G | No leaking | No peaking | Pass |
| 1A + 1B | Remoistening | Hardwood | No leaking | No peaking | Pass |
| 1A* + 1B* | Remoistening | 10 mil T&G | No leaking | No peaking | Pass |

Aging Test

Dry Adhesive Aging Test - 1A & 1B, 10 mil gap laminate substrates
I. Heat Stability (110° F. Oven test)

| | | 110° F. Oven | | | | |
|---|---|---|---|---|---|---|
| | Dry | Avg. Bond | Average | 24 hrs Standing Water | | |
| Samples | time | Strength (PLI) | % fiber tear | Leaking | Peaking | Results |
| 1A + 1B | 2 Weeks | | | No | No | Pass |
| 1A + 1B | 1 Month | 119 | 60% | No | No | Pass |
| 1A + 1B | 2 Months | 127 | 68% | No | No | Pass |
| 1A + 1B | 3 Months | 175 | 93% | No | No | Pass |

Aging Test—laminate

Dry Adhesive Aging test - 1A&1B, 10 mil gap laminate substrates
II. Heat Stability (55° C. Oven Test)

| | | 55° C. Oven | | | | |
|---|---|---|---|---|---|---|
| | Dry | Avg. Bond | Average | 24 hrs Standing Water | | |
| Samples | time | Strength (PLI) | % fiber tear | Leaking | Peaking | Results |
| 1A + 1B | 1 week | 150 | 53% | No | No | Pass |
| 1A + 1B | 2 week | 125 | 45% | No | No | Pass |

-continued

III. Heat & Humidity Stability (100° F., 95% RH test in the zip-loc bag)

| | | 100° F., 95% RH Oven | | 24 hrs Standing Water | | |
|---|---|---|---|---|---|---|
| Samples | Dry time | Avg. Bond Strength (PLI) | Average % fiber tear | Leaking | Peaking | Results |
| 1A + 1B | 1 week | 186 | 100% | No | No | Pass |
| 1A + 1B | 2 week | 141 | 100% | No | No | Pass |

Remoistenability

Dry Adhesive Remoistening Time test - 1A & 1B

Dried at RT for 5 days

| | | Avg. Bond | Average | 24 hrs Standing Water | | |
|---|---|---|---|---|---|---|
| Samples | Remoistening | Strength (PLI) | % fiber tear | Leaking | Peaking | Results |
| 1A + 1B | immediate | 90 | 92% | No | No | Pass |
| 1A + 1B | 30 sec | 123 | 100% | No | No | Pass |
| 1A + 1B | 1 min | 121 | 100% | No | No | Pass |
| 1A + 1B | 2 min | 118 | 100% | No | No | Pass |

Creep Test

| Laminate Manufacturer | Type Joining System | Method of System Preparation/application | |
|---|---|---|---|
| Mannington | 10 mil T&G | Pre-applied & Remoistened | 1000 g weight |

| Sample | Initial Time | Gap Opening at Prescribed Times | | | | | | | Results |
|---|---|---|---|---|---|---|---|---|---|
| | | 1 day | 2 day | 3 day | 5 day | 8 day | 11 day | 14 day | |
| I | 3.9 mil | 3.9 mil | 3.9 mil | 3.9 mil | 3.9 mil | 3.9 mil | 3.9 mil | 3.9 mil | No creep |
| II | 5.9 mil | 5.9 mil | 5.9 mil | 5.9 mil | 5.9 mil | 5.9 mil | 5.9 mil | 5.9 mil | No creep |
| III | 4.3 mil | 4.3 mil | 4.3 mil | 4.3 mil | 4.3 mil | 4.3 mil | 4.3 mil | 4.3 mil | No creep |
| IV | 2.4 mil | 2.4 mil | 2.4 mil | 2.4 mil | 2.4 mil | 2.4 mil | 2.4 mil | 2.4 mil | No creep |
| V | 3.9 mil | 3.9 mil | 3.9 mil | 3.9 mil | 3.9 mil | 3.9 mil | 3.9 mil | 3.9 mil | No creep |

Conclusion:
No joint separation was observed after 2 weeks

Example 2

Part-A adhesive (1A) was applied on the entire surface of the tongues of the engineered wood floor and laminate floor. Part-B (1B) of the adhesive which contains the crosslinker was applied on the entire surface of the grooves of the engineered wood floor (Mannington's Montana Oak Plank) and the laminate floor (Mannington's Traditional Collection). They were dried at ambient conditions for 3 days. Then both the tongue and groove were remoistened by spraying water. After that the floor panels were allowed to stand for 1 minute and then they were put together. After 24 hours, the bond strength and the seam swell of the flooring panels were tested.

| Properties/Tests | Mannington Engineered Wood Floor | Mannington Laminate Floor |
|---|---|---|
| Bond Strength (PLI) | 84.7 ± 30.3 | 115.3 ± 17.9 |
| % Weight gain after 24 hours of wet sponge swell test | 0.33 | 0.17 |
| % Seam Peaking after 24 hours of wet sponge test | 0.60 ± 0.39 | 2.92 ± 0.45 |

A damp or wet sponge is placed on the seam of the flooring and is covered with a watch-glass or petri dish for 24 hours. The water is absorbed by the floor and the change in the thickness of the seam is measured. Example-2 shows that this adhesive system can be effectively used to join any cellulose or wood-based flooring products.

Example 3

Part-A adhesive (1A) was applied on the entire surface of the tongue of the engineered wood floor (Mannington's Montana Oak Plank). Part-B (1B) of the adhesive which contains the crosslinker was applied on the entire surface of the groove of the engineered wood floor. In this example the effect of one coat vs. two coats were studied. After applying the adhesives they were dried at 120° F. overnight. Then the bond strengths were tested.

| Number of Coats | Bond Strength (PLI) |
|---|---|
| 1 | 35.9 ± 4.2 |
| 2 | 64.5 ± 5.1 |

Two coats result in a better bond strength. So the amount of adhesive applied can be optimized to have the desired bond strength.

Example 4

In this example the effect of pre and post aging of the preapplied adhesive on engineered wood flooring (Mannington's Montana Oak Plank) was examined. Adhesives with two different viscosities were tested. 1A was applied on the entire surface of the tongue of Mannington engineered wood product and the 1B was applied on the groove and the adhesives were allowed to dry for 24 hours at ambient conditions and then the tongue and groove were remoistened by spraying water. The planks were put together using a tapping block. The bond strength was tested after 24 and 72 hours. The 72 hour samples were put into high humidity chamber (100% RH at 85° F.) to study the effect of humidity on the bond strength. The samples were post aged in high humidity for a week and the data indicated that there was not a significant decrease in the bond strength. This indicates that once the crosslinking has taken place or the bond has been formed, it is stable under high humidity conditions.

In another experiment, the planks were pre-aged in high humidity for different periods of time and the samples were taken out and remoistened and joined together and the bond strengths were tested after 24 hours. This permits the study of extreme storage conditions of the finished flooring products. When the products were subjected to very high humidity conditions for a long period of time, there was a decrease in the bond strength. This can be avoided by wrapping the box containing the finished products with plastic, so the moisture can enter the package. As shown in the example, the 2-part adhesive can be formulated to minimize the effect of high humidity.

| Properties | 1 | 2 |
|---|---|---|
| Viscosity of 1A & 1B (Zahn Cup #2) in sec | 30 | 45 |
| Bond strength after 24 hours | 104.0 ± 24.5 | 96.2 ± 12.0 |
| Bond Strength after 72 hours | 94.7 ± 19.2 | 86.5 ± 12.0 |
| Post aging at 100% RH & 85° F. | | |
| Bond Strength after 24 hours | 95.9 ± 23.9 | 106.7 ± 13.0 |
| Bond Strength after 72 hours | 87.8 ± 20.4 | 92.6 ± 18.9 |
| Bond Strength after 1 week | 102.2 ± 16.1 | 84.6 ± 8.5 |
| Pre-aging at 100% RH and 85° F. | | |
| Bond Strength After 24 hours | 73.5 ± 19.9 | 59.3 ± 12.2 |
| Bond Strength After 72 hours | 73.1 ± 8.9 | 63.1 ± 11.9 |
| Bond Strength After 1 Week | 32.5 ± 15.9 | 44.3 ± 11.0 |
| Bond Strength after 2 weeks | 37.5 ± 17.6 | 47.8 ± 10.6 |
| Bond Strength After 3 weeks | 50.2 ± 19.8 | 50.4 ± 14.5 |
| Bond Strength after 4 weeks | 50.2 ± 14.0 | 19.74 ± 12.5 |

Example 5

A modified tongue and groove was prepared whereby the upper faces of the tongue and groove were brought into closer proximity than the standard tongue and groove. This was done by decreasing the angle between the two vertical faces to 5 degrees, rather than the standard 10 degrees. Both tongue and groove were coated with 0.34 grams wet of 1A and 1B respectively and allowed to dry.

The groove was misted and joined immediately. The Instron Tensile Bond Peak Strength was measured 24 hours later. The strength readings were 127+/−10 pounds per linear inch (pli).

The results are summarized below.

| Joint Part | Adhesive used on Part | Bond Strength, pli |
|---|---|---|
| Joint Type I | | |
| Tongue | A | 127 +/− 10 |
| Groove | B | |

Example 6

Remoistenable adhesive

Adhesive part 1A was applied with a vacuum coater on the tongue side of a laminate plank. Adhesive part 1B was applied with a vacuum coater to the groove side of a laminate plank. The formula for the adhesive was adjusted slightly by adding water to change the viscosity to between 300 cps to 600 cps.

The planks were passed through the vacuum coater at 30 meters/minute. A number of combinations were run. Combinations were single and double pass through the coater. Air drying and mild heat drying with convection oven were also done. The mild heat drying was done at 43° C. with a residence time in the oven of 30 seconds.

The adhesive part B was coated at viscosities ranging from 300 cps to 600 cps Brookfield #2 spindle, 20 rpm. Part A was at 450 cps.

The planks were weighed before and after each coating pass. On average a single pass deposited 1.2 grams per 50.6 inch long edge of the specific tongue and groove cross section chosen. Drying between coats and applying a second coat produced a total deposited weight of 2.2 grams.

The first coat was at least partially dry before applying the second coat. If the second coat was applied while the first was still wet, additional weight was generally not added. Therefore, an interaction existed between the number of coats and appropriate drying between coats.

To test bond strength, the plank edges were misted with a pump atomizer and the planks were joined. The peak bond strength was measured 24 hours later. Bond values ranged from 63 pounds per inch of bond to 136 pounds per inch. Average bond values for one coat adhesive application was 90 pounds per inch. The average bond value for a two coat adhesive application was 108 pounds per inch.

The moisture swell growth at seam resulting from 24 hour contact with a wet sponge resulted in swell from 0.0004 to 0.012 inch. The average was 0.0048 inches.

Example 7

Remoistenable Adhesive

Preparation of plank and remoistening procedure to reactivate the adhesive at point of installation was performed as described in the following example.

Standard tongue and groove joints (3" strip of Wilmington Oak Plank) were prepared by putting part A (1A) of the remoistenable adhesive onto the tongue and part B (1B) into the groove by a vacuum coating machine. This vacuum coating machine deposits the liquid adhesive part A onto the specific joint, and vacuums off the excess leaving a thin film of evenly distributed liquid adhesive on the specific joint. Once dried, the adhesive can be reactivated by wetting and brought together with the other member of the joint. This wetting can be done by a water spray, a mist or direct deposition of the water onto the joint.

The following table illustrates methods of activating of the remoistenable adhesive along with the bonds achieved with the particular method.

| Method Number | Product | Bond Strength, pli | Description* |
|---|---|---|---|
| 1 | Wood | 148 +/− 35 | Steam Iron T&G. No OT |
| 2 | Wood | 86 +/− 31 | Sprayed T&G. No OT |
| 3 | Wood | 128 +/− 25 | CoreWeld Tip G. No OT |
| 4 | Wood | 13 +/− 1 | No Moistening. |
| 5 | Laminate | 119 +/− 10 | Spray T&G. No OT |
| 6 | Laminate | 130 +/− 22 | Steam Iron T&G. No OT |
| 7 | Laminate | 71 +/− 26 | CoreWeld Tip G. No OT |
| 8 | Laminate | 76 +/− 27 | Sprayed T&G. Wait 30 seconds |
| 9 | Laminate | 92 +/− 17 | Steam Iron T&G. Wait 30 seconds |
| 10 | Laminate | 8 +/− 1 | No Moistening |

*OT = open time
*T&G = Tongue and Groove

Both wood and laminate tongue and groove products were prepared with the remoistenable adhesive. In methods 1, 6, and 9, the two members of the joint were laid within one inch of each other. A steam iron, dispensing a fine fog of steam was passed directly above where the two joint members laid. In methods 1 and 6, the joint was immediately made. In method 9, the joint was made thirty seconds after the being misted with the steam. All bond strengths were pulled twenty four hours after joining. The bonds were pulled on an MTS (Instru-Met/ MTS Systems Corporation) universal tester with cross-head speed of 0.5 inches per minute. Results are reported in pounds of force per inch of bond required to separate the members of the joint.

In methods 2, 5, and 8, the bond members were sprayed with a manual mist applicator. In cases 2 and 5, the joint was made immediately. In case 8, a thirty second delay existed before the joint was made.

In methods 3 and 7, Core Weld Tip (small nozzle squeeze bottle) applicator was pierced in an upper and lower location so that a small stream of water could be applied to the upper and lower surface of the groove member of the joint only. Both members of the joint were then pushed together.

Methods 4 and 10 are strengths of wood and laminate tongue and groove joints respectively made without water or mist application as comparisons. The strength of the joints prepared with the moistening devices is evident.

Example 8

Remoistenable Application with Pump Misting Device. Variables Governing Application A particularly useful moisture applicator was a non-contact pump misting device. This device is commonly available as a cooling device used in the hot sun. The device is available from Misty Mate, Inc of Gilbert, Ariz. This device allows the operator to manually pump a head of pressure over a small water bottle. Opening a valve or pressing a trigger then generates a very fine mist which spreads out from the nozzle. This non-contact method could be particularly useful as it will not scrape the adhesive or cause a messy buildup on the nozzle.

The robustness of the installation variables was studied with an experimental design used to test angles at which the nozzle was held, and speeds at which the nozzle was moved over the joint it was moistening. The mister was used to moisten the surfaces primarily of the groove. However, the close proximity of the tongue usually resulted in some moistening effect on it as well. The nozzle was directed at the groove from angles of 0 degrees (horizontal), 45 degrees, and 90 degrees (vertical). The speed at which the nozzle was pulled was 1 foot per second and 2 feet per second. Bond strengths ranged from 48 to 153 pli (pounds per inch). Six tensile pulls were run on each joint, and a set of replicate joints were made. Data was analyzed using the Minitab® statistical software.

The data is presented in the table below:

| Blocks | Angle | Speed | Bond Strength @ 24 hr, pli |
|---|---|---|---|
| 1 | 90 | 2 | 94.82 |
| 1 | 45 | 1 | 113.55 |
| 1 | 45 | 2 | 48.39 |
| 1 | 90 | 1 | 91.12 |
| 1 | 0 | 2 | 102.33 |
| 1 | 0 | 1 | 89.15 |
| 2 | 90 | 2 | 153.32 |
| 2 | 0 | 2 | 63.98 |
| 2 | 0 | 1 | 56.26 |
| 2 | 45 | 2 | 65.35 |
| 2 | 90 | 1 | 96.40 |
| 2 | 45 | 1 | 79.73 |

The analysis of variance indicates the robustness of the bond to angle mist application and application speed at the 95% confidence level.

This is shown below:

| General Linear Model: Bond Strength @ versus Blocks, Angle, Speed | | | |
|---|---|---|---|
| Factor | Type | Levels | Values |
| Blocks | fixed | 2 | 1 2 |
| Angle | fixed | 3 | 0 45 90 |
| Speed | fixed | 2 | 1 2 |

-continued

Analysis of Variance for Bond Str, using Adjusted SS for Tests

| Source | DF | Seq SS | Adj SS | Adj MS | F | P |
|---|---|---|---|---|---|---|
| Blocks | 1 | 49.3 | 49.3 | 49.3 | 0.05 | 0.821 |
| Angle | 2 | 2661.0 | 2661.0 | 1330.5 | 1.48 | 0.290 |
| Speed | 1 | 0.3 | 0.3 | 0.3 | 0.00 | 0.985 |
| Error | 7 | 6277.0 | 6277.0 | 896.7 | | |
| Total | 11 | 8987.5 | | | | |

None of these variables, such as angle or speed of nozzles produces a significant effect.

Example 9

Effect of Environmental Conditioning on Bond

The effect of acclimatization prior to bonding was reviewed to determine the effect on bond strength that certain installation variables would have. Bonds were prepared with the following types of preconditioning:

Type 1: Joining at ambient conditions as control.
Type 2: Refrigeration of laminate at 40° F. for 24 hours, then joining immediately
Type 3: Refrigeration of laminate at 40° F. for 24 hours, then allowing 24 hours to acclimatize to ambient conditions, then joining.

A designed experiment was conducted where the effect of the environmental conditions and the time from joining were studied for effect on bond strength. Six bond specimens were pulled for each of the above types at times of 4 hour, 24 hour, 48 hour, and 168 hour after joining.

The bond was produced by misting the groove with a pump mist device as described in an earlier example.

Results are shown below:

| Environmental Condition Type | Time, hr | Bond Strength, pounds per inch |
|---|---|---|
| 1 | 4 | 68 |
| 1 | 24 | 79 |
| 1 | 48 | 81 |
| 1 | 168 | 72 |
| 2 | 4 | 57 |
| 2 | 24 | 80 |
| 2 | 48 | 84 |
| 2 | 168 | 74 |
| 3 | 4 | 76 |
| 3 | 24 | 73 |
| 3 | 48 | 62 |
| 3 | 168 | 52 |

The analysis of variance for this study shows no significant difference in bond strength due to environmental condition or time from bond at four hours and beyond. See below:

Analysis of Variance for Bond Strength - Type III Sums of Squares

| Source | Sum of Squares | Df | Mean Square | F-Ratio | P-Value |
|---|---|---|---|---|---|
| MAIN EFFECTS | | | | | |
| A: Environment | 201.5 | 2 | 100.75 | 1.02 | 0.4141 |
| B: Time | 305.667 | 3 | 101.889 | 1.04 | 0.4413 |
| RESIDUAL | 589.833 | 6 | 98.3056 | | |
| TOTAL (CORRECTED) | 1097.0 | 11 | | | |

All F-ratios are based on the residual mean square error.
The StatAdvisor
The ANOVA table decomposes the variability of Bond Strength into contributions due to various factors. Since Type III sums of squares (the default) have been chosen, the contribution of each factor is measured having removed the effects of all other factors. The P-values test the statistical significance of each of the factors. Since no P-values are less than 0.05, none of the factors have a statistically significant effect on Bond Strength at the 95.0% confidence level.
Note: the analysis and comments above were performed on Statgraphics ® statistical software.

This indicates that the adhesive is fast acting and robust (insensitive) to the environment prior to bonding.

Example 10

Repositioning Time During Installation of Laminate Products

The remoistenable adhesive forms bond strength quickly. The quick build strength of the adhesive should still allow adequate time for repositioning during installation. The data shown in FIG. 1 demonstrates the installer has about five minutes before the adhesive strength dramatically increases in value for the preferred formulation.

Example 11

Heavy Load Abuse Resistance of the Adhesive Bond of Laminate Products

The adhesive bond formed by the remoistenable adhesive is able to withstand heavy rolling loads repeatedly flexing the bonded joint. The data below indicates that a bond made with this adhesive and activated with a spray mist directed into the groove of the joint can withstand the intense load of 150 pounds riding on one caster wheel for at least one thousand repeated cycles.

Figure 2:
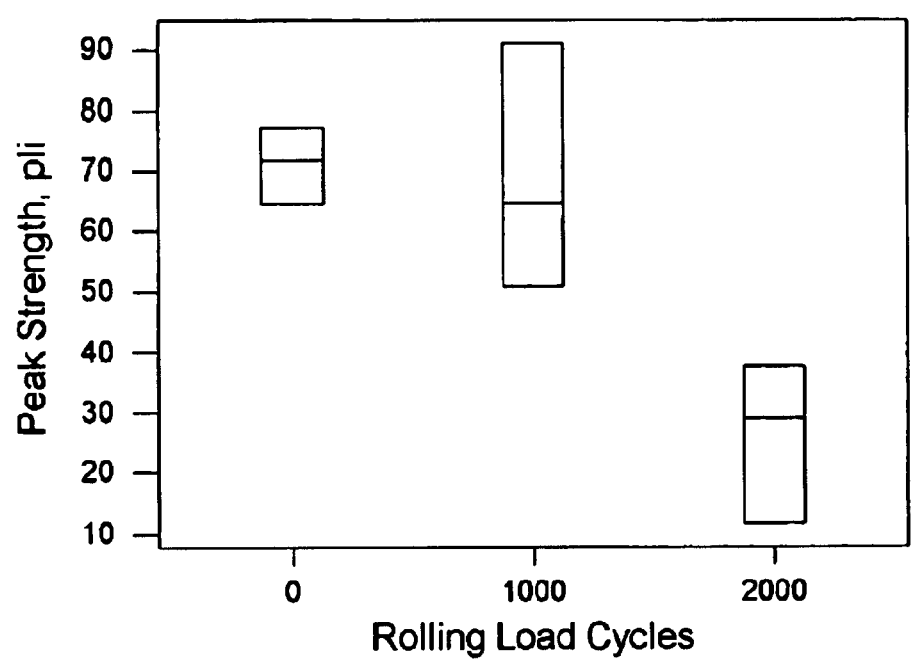
FIG. 2 is a graph showing peak strength over rolling load cycles for flooring with an adhesive of the present invention.

Bond strengths were taken prior to load testing and after prescribed numbers of cycles as shown in FIG. 2. The strength of the bond did not diminish until after one thousand cycles. The castor used in these trials was a 92 Shore A durometer castor similar to those utilized in hospital beds.

The intervals on the graph in FIG. 2 represent 95% confidence intervals of the mean.

Example 12

Two part Remoistenable Adhesive System Used With i-CORE™ Polymer Planking

A system of remoistenable two-part adhesive was used on i-CORE™ polymer planking where the spline was treated with component A and the groove was treated with component B. The spline was 0.141 inch thick flat band with rectangular cross section.

The grooves of the planking to which it was joined were treated with adhesive component B.

The joint was made by remoistening the adhesive in the groove with a mist applicator. The bond was allowed to cure for 24 hours. Tensile pulls were taken with the MTS universal testing machine. Cross-head speed was 0.5 inches per minute. Break tensile strength was between 18 and 31 pounds with average value of 24 pounds.

As can be seen from the above tests, the 2-part adhesive system pre-applied to floor panels permits an excellent joint strength even with laminate floors having a 10 mil or more opening between the edges. In fact, joint strengths above 140 PLI were achieved with the present invention. In addition, the joined floor panels showed excellent remoistenability up to 55° C. for at least 2 weeks. In addition, this good remoistenability was achievable even under high humidity conditions (95%) with high temperatures such as 100° F. for at least 2 weeks. Furthermore, the tests even showed good remoistenability at 110° F. for at least 3 months. In addition, the tests showed that the floor panels were easily installed and the remoistening was possible with water and wherein the remoistening time was 2 minutes or less, wherein the remoistening involved the application of water prior to installing the floor panels.

In addition, after the floor panels were cured, the floor panels, especially the joints, showed excellent water resistance and passed the 24 hour standing water test with no peaking or leaking even at various aging conditions. Also, the final adhesive film hardness showed no creep even after two weeks.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A floor panel having at least two side edges, wherein at least one side edge has a first adhesive component on at least a portion of the side edge and a second side edge has a second adhesive component on at least a portion of the side edge, wherein said first adhesive component comprises at least one crosslinkable acetate polymer and at least one water-soluble polymer and the second adhesive component comprises at least one non-crosslinkable acetate polymer, at least one water soluble polymer and at least one crosslinking agent.

2. The floor panel of claim 1, wherein said floor panel is a laminate floor panel.

3. The floor panel of claim 1, wherein said floor panel comprises a polymer plank.

4. The floor panel of claim 1, wherein said floor panel is a hardwood floor panel.

5. The floor panel of claim 1, wherein the said floor panel is an engineered wood floor.

6. The floor panel of claim 1, wherein said floor panel has at least one tongue.

7. The floor panel of claim 1, wherein said floor panel has at least one groove.

8. The floor panel of claim 1, wherein said floor panel has at least one tongue and at least one groove.

9. The floor panel of claim 1, wherein said first adhesive component and said second adhesive component are present on the side edges that come in contact with one or more edges of opposing floor panels.

10. The floor panel of claim 1, wherein said first adhesive component and second adhesive component are present as a uniform coating.

11. A floor panel having at least one side edge that has either a) first adhesive component on a portion of the side edge, or b) a second adhesive component on at least a portion of the side edge, wherein said first adhesive component comprises at least one crosslinkable acetate polymer and at least one water-soluble polymer and the second adhesive component comprises at least one non-crosslinkable acetate polymer, at least one water soluble polymer and at least one crosslinking agent.

12. The floor panel of claim 11, wherein said floor panel is a laminate floor panel.

13. The floor panel of claim 11, wherein said floor panel comprises a polymer plank.

14. The floor panel of claim 11, wherein said floor panel is a hardwood floor panel.

15. The floor panel of claim 11, wherein the said floor panel is an engineered wood floor.

16. The floor panel of claim 11, wherein said floor panel has at least one tongue.

17. The floor panel of claim 11, wherein said floor panel has at least one groove.

18. The floor panel of claim 11, wherein said floor panel has at least one tongue and at least one groove.

19. The floor panel of claim 11, wherein said first adhesive component and said second adhesive component are present on the side edges that come in contact with edges of opposing floor panels.

20. The floor panel of claim 11, wherein said first adhesive component and second adhesive component are present as a uniform coating.

21. A floor surface comprising a plurality of planks joined together wherein at least a portion of the planks are joined together at least in part by an adhesive comprising the reaction product of a first adhesive component and a second adhesive component, wherein said first adhesive component comprises at least one crosslinkable acetate polymer and at least one water-soluble polymer and the second adhesive component comprises at least one non-crosslinkable acetate polymer, at least one water soluble polymer and at least one crosslinking agent.

22. The floor surface of claim 21, wherein the bond strength of the joined planks is from about 1 PLI to about 250 PLI.

23. The floor surface of claim 21, wherein the edges of the planks joined together is water resistant.

24. The floor surface of claim 21, wherein said planks are joined together using a tongue and groove connecting system.

25. A method of installing a floor surface comprising joining at least two or more floor planks together, wherein one floor panel having at least one side edge having a first adhesive component present is joined together with a second floor panel having at least one side edge having a second adhesive component present on the edge, wherein said first adhesive component comprises at least one crosslinkable acetate polymer and at least one water-soluble polymer and the second adhesive component comprises at least one non-crosslinkable acetate polymer, at least one water soluble polymer and at least one crosslinking agent.

26. The method of claim 25, wherein water is applied to the side edge having the first adhesive component or the side edge having the second adhesive component or both prior to connecting the edges together.

27. The method of claim 25, wherein the one edge or second edge or both upon being contacted with water are left standing at least one minute prior to joining the edges together.

28. The method of claim 25, wherein said edges upon being connected together activate the adhesive and forms a durable water-resistant bond.

29. The floor panel of claim 1, wherein said first adhesive component or second adhesive component can remain dormant for at least one month.

30. The floor panel of claim 1, wherein the crosslinkable acetate copolymer is a vinyl acetate copolymer.

31. The floor panel of claim 30, wherein the crosslinkable copolymer is N-methylol acrylamide vinyl acetate copolymer.

32. The floor panel of claim 1, wherein the non-crosslinkable acetate is vinyl acetate homopolymer or copolymer.

33. The floor panel of claim 1, wherein the water soluble polymer is polyvinyl alcohol.

34. The floor panel of claim 33, wherein the polyvinyl alcohol has a degree of hydrolysis of less than 80%.

35. The floor panel of claim 1, wherein the first adhesive component comprises a N-methylol acrylamide vinyl acetate polymer and polyvinyl alcohol and the second adhesive component comprises a vinyl acetate homopolymer, a polyvinyl alcohol and a crosslinking agent.

36. The floor panel of claim 1, wherein one side edge has a tongue with a mechanical locking design and the opposite side edge has a groove with a counterpart mechanical locking design, another side edge has a tongue with a non-mechanical locking design and the opposite side edge has a groove with a counter part non-mechanical locking design.

37. The method of claim 25, wherein the one edge or second edge upon being contacted with water are immediately joined together.

38. Two or more floor panels joined together comprising at least one floor panel of claim 11.

39. The method of claim 25, wherein at least one of said side edge having said first adhesive component or said second adhesive component is moistened by a non-contact misting device having an optional triggering device.

* * * * *